US012580227B2

(12) United States Patent
Cao et al.

(10) Patent No.: US 12,580,227 B2
(45) Date of Patent: Mar. 17, 2026

(54) BISSULFONATE COMPOUND, PREPARATION METHOD THEREFOR, ELECTROLYTE SOLUTION AND ENERGY STORAGE DEVICE

(71) Applicant: GUANGZHOU TINCI MATERIALS TECHNOLOGY CO., LTD., Guangzhou (CN)

(72) Inventors: Gejin Cao, Guangzhou (CN); Weizhen Fan, Guangzhou (CN); Chaojun Fan, Guangzhou (CN); Lei Xu, Guangzhou (CN); Yong Xin, Guangzhou (CN); Jingwei Zhao, Guangzhou (CN)

(73) Assignee: GUANGZHOU TINCI MATERIALS TECHNOLOGY CO., LTD., Guangzhou (CN)

( * ) Notice: Subject to any disclaimer, the term of this patent is extended or adjusted under 35 U.S.C. 154(b) by 782 days.

(21) Appl. No.: 17/762,307

(22) PCT Filed: Sep. 17, 2020

(86) PCT No.: PCT/CN2020/115937
§ 371 (c)(1),
(2) Date: Apr. 28, 2022

(87) PCT Pub. No.: WO2021/057597
PCT Pub. Date: Apr. 1, 2021

(65) Prior Publication Data

US 2023/0009549 A1 Jan. 12, 2023

(30) Foreign Application Priority Data

Sep. 23, 2019 (CN) ........................ 201910900418.0

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0037* (2013.01)

(58) Field of Classification Search
None
See application file for complete search history.

(56) References Cited

U.S. PATENT DOCUMENTS 3,346,612 A 10/1967 Hansen
3,733,304 A 5/1973 Firth, Jr.
(Continued)

FOREIGN PATENT DOCUMENTS

CN 1653641 A 8/2005
CN 101203982 A 6/2008
(Continued)

OTHER PUBLICATIONS

Machine translation of JP2009140921A (Year: 2024).*
(Continued)

*Primary Examiner* — Brian R Ohara
*Assistant Examiner* — M. T. Leonard
(74) *Attorney, Agent, or Firm* — Kagan Binder, PLLC

(57) ABSTRACT

Provided are a bissulfonate compound, a preparation method therefor, an electrolytic solution and an energy storage device. The bissulfonate compound has a structure of (I) and is applied as an additive to an energy storage device, so that a stable SEI film can be formed on a surface of an anode of the energy storage device, and the decomposition of a solvent in the electrolytic solution can be suppressed. As the stable SEI film can be formed on the surface of the anode, lithium ions can be smoothly embedded and disembedded at a low temperature, thereby improving the low-temperature performance of the energy storage device.
(Continued)

f1(ppm)

(I)

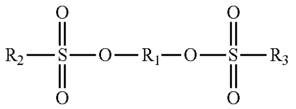

16 Claims, 2 Drawing Sheets

(51) Int. Cl.

*H01M 10/0568* (2010.01)
*H01M 10/0569* (2010.01)

(56) References Cited

U.S. PATENT DOCUMENTS

| | | | | |
|---|---|---|---|---|
| 9,574,046 | B1 | 2/2017 | Ober et al. | |
| 2005/0118512 | A1 | 6/2005 | Onuki et al. | |
| 2010/0291437 | A1* | 11/2010 | Abe .................. | H01M 10/0567 429/207 |
| 2011/0014504 | A1 | 1/2011 | Onuki et al. | |
| 2012/0189919 | A1 | 7/2012 | Abe et al. | |
| 2013/0130128 | A1 | 5/2013 | Okamoto et al. | |
| 2015/0155597 | A1 | 6/2015 | Ishikawa et al. | |
| 2017/0051102 | A1 | 2/2017 | Ober et al. | |
| 2017/0196985 | A1 | 7/2017 | Dong et al. | |
| 2018/0145375 | A1* | 5/2018 | Wang ................ | H01M 10/0567 |

FOREIGN PATENT DOCUMENTS

| | | | | | |
|---|---|---|---|---|---|
| CN | 102484280 | A | | 5/2012 | |
| CN | 103053060 | A | | 4/2013 | |
| CN | 103094616 | A | | 5/2013 | |
| CN | 105489935 | A | | 4/2016 | |
| CN | 106467606 | A | | 3/2017 | |
| CN | 106659700 | A | | 5/2017 | |
| CN | 110212235 | A | | 9/2019 | |
| CN | 110668978 | A | | 1/2020 | |
| CN | 112786966 | A | * | 5/2021 | ........ H01M 10/0567 |
| EP | 2469638 | A1 | | 6/2012 | |
| JP | 2009140921 | A | * | 6/2009 | |
| WO | 2021109687 | A1 | | 6/2021 | |

OTHER PUBLICATIONS

Machine translation JP2009140921A, Japanese redacted (Year: 2025).*

Machine translation CN112786966A (Year: 2025).*

Registry RN1899045-61-4 (Apr. 27, 2016); RN1899045-66-9 (Apr. 27, 2016); RN1436431-87-6 (Jun. 10, 2013). RN1356835-23-8 (Feb. 15, 2012); RN1356835-27-2 (Feb. 15, 2012); RN1436431-86-5 (Jun. 10, 2013); RN1236185-84-4. (Aug. 15, 2010). (See International Search Report for PCT/CN2020/115937 submitted with IDS on Mar. 21, 2022).

International Search Report and Written Opinion, and English Translation of the Search Report thereof, for International Application No. PCT/CN2020/115937, mailed Dec. 17, 2020 (14 pages).

Chinese First Office Action, and English Translation thereof, for counterpart Chinese Application No. 201910900418.0, mailed Mar. 18, 2021 (20 pages).

Chinese Second Office Action, and English Translation thereof, for counterpart Chinese Application No. 201910900418.0, mailed Aug. 6, 2021 (12 pages).

Liang et al., "Palladium-Catalyzed, Ligand-Free Suzuki Reaction in Water Using Aryl Fluorosulfates," Organic Letters, vol. 17, Issue 8, pp. 1942-1945, 2015, (4 pages).

Abe et al., "Functional Electrolytes: Recent Advances in Development of Additives for Resistance Reduction," Journal of the Electrochemical Society, vol. 161, No. 6, pp. A863-A870, 2014, (8 pages).

Extended European Search Report for European Counterpart Application No. 20867884.7, mailed on Nov. 8, 2022, (8 pages).

* cited by examiner

BISSULFONATE COMPOUND, PREPARATION METHOD THEREFOR, ELECTROLYTE SOLUTION AND ENERGY STORAGE DEVICE

CROSS-REFERENCE TO RELATED APPLICATIONS

This application is a national stage of International Patent Application No. PCT/CN2020/115937, filed on Sep. 17, 2020, and entitled "BISSULFONATE COMPOUND, PREPARATION METHOD THEREFOR, ELECTROLYTE SOLUTION AND ENERGY STORAGE DEVICE", the content of which is incorporated herein by reference in its entirety.

TECHNICAL FIELD

The present disclosure relates to the technical field of electrolyte solution, in particular to a bissulfonate compound, a preparation method thereof, an electrolyte solution and an energy storage device.

BACKGROUND

Lithium ion battery is widely used in power, energy storage, aerospace, digital and other fields due to its advantages of high energy density, high charging efficiency and long cycle life. With continuous progress of technology, higher requirements on the performance of batteries are put forward by consumers. In addition to good performance of the battery at room temperature, it is also expected that the battery can still have good performance under high temperature and low temperature conditions. At present, in order to improve the high-temperature performance of the battery, solvents with high boiling point are generally selected to prepare electrolyte solutions; and in order to improve the low-temperature performance of the battery, solvents with lower melting point are selected to prepare electrolyte solutions. Such methods can improve the high-temperature performance or low-temperature performance of the battery to a certain extent, but as the use range of the battery expands continuously, thus methods that cannot give consideration to both high-temperature performance and low-temperature performance cannot meet the use requirements of the battery.

SUMMARY

In view of the above, it is necessary to provide a bissulfonate compound, its preparation method, an electrolyte solution and an energy storage device. When the bissulfonate compound is applied to the electrolyte solution, both high-temperature performance and low-temperature performance of the energy storage device can be ensured.

The bissulfonate compound has a structure shown by General Formula (I):

(I)

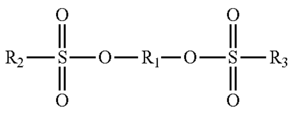

wherein $R_1$ is selected from the group consisting of chain alkyl containing 1 to 6 carbon atoms, ternary cycloalkyl, quaternary cycloalkyl, 5-membered cycloalkyl, 6-membered cycloalkyl, phenyl, tolyl, 5-membered heterocyclic group or 6-membered heterocyclic group; and $R_2$ and $R_3$ are independently selected from the group consisting of hydrogen atom, halogen atom, alkyl containing 1 to 6 carbon atoms or haloalkyl containing 1 to 6 carbon atoms.

In an embodiment, $R_1$ is selected from the group consisting of ternary cycloalkyl, quaternary cycloalkyl, 5-membered cycloalkyl, 6-membered cycloalkyl, phenyl, 5-membered heterocyclic group or 6-membered heterocyclic group, and

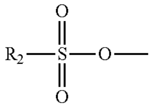 and 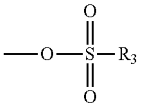

are in ortho-position, meta-position or para-position.

In an embodiment, $R_1$ is selected from the group consisting of methylene, cyclopropyl, cyclobutyl, cyclopentyl, cyclohexyl, phenyl, furan, thiophene, pyrrole, thiazole, imidazole, pyridine, pyrazine, pyrimidine or pyridazine.

In an embodiment, $R_2$ and $R_3$ are independently selected from the group consisting of hydrogen atom, fluorine atom, methyl, ethyl, propyl, butyl, pentyl, hexyl, isopropyl, isobutyl, sec-butyl, tert-butyl, isopentyl, isohexyl, fluoromethyl, fluoroethyl, fluoropropyl, fluorobutyl, fluoropentyl, fluorohexyl, fluoroisopropyl, fluoroisobutyl, fluorosec-butyl, fluorotert-butyl, fluoroisopentyl or fluoroisohexyl.

In an embodiment, $R_2$ and $R_3$ are independently selected from the group consisting of trifluoromethyl, trifluoroethyl, trifluopropyl, trifluorobutyl, trifluoropentyl, trifluorohexyl, trifluoroisopropyl, trifluoroisobutyl, trifluorosec-butyl, trifluorotert-butyl, trifluoroisopentyl or trifluoroisohexyl.

The method for preparing the bissulfonate compound as described in any one of above-mentioned embodiments includes the following step: reacting a dihydroxy compound having General Formula (II), a first sulfonyl halide having General Formula (III) and a second sulfonyl halide having General Formula (IV) in a solvent added with alkali under a protective gas atmosphere, $$HO—R_1—OH \quad (II)$$

(III)

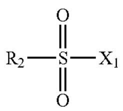

(IV)

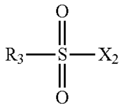

wherein, $X_1$ and $X_2$ are independently selected from halogen atoms; reaction temperature is −50° C. to 100° C.; and reaction time is 0.1 h to 24 h.

In an embodiment, a ratio of a sum of amounts of substance of the first sulfonyl halide and the second sulfonyl halide to an amount of substance of the dihydroxy compound is (0.5~5):1; and a ratio of the sum of the amounts of substance of the first sulfonyl halide and the second sulfonyl halide to an amount of substance of the alkali is 1:(0.5~3).

In an embodiment, the alkali is one or more of potassium hydroxide, potassium carbonate, sodium hydroxide, calcium hydroxide, pyridine, pyrrole, imidazole, trimethylamine and triethylamine; and/or said solvent is one or more of toluene, dichloroethane, acetonitrile, dimethyl sulfoxide and acetone.

The electrolyte solution includes an electrolyte, a solvent and an additive, said additive is the bissulfonate compound as described in any one of above-mentioned embodiments.

In an embodiment, said electrolyte accounts for 5% to 20% of the weight of said electrolyte solution.

In an embodiment, said additive accounts for 0.01% to 10% of the weight of said electrolyte solution.

In an embodiment, said electrolyte is one or more of lithium hexafluorophosphate, lithium tetrafluoroborate, lithium difluorophosphate and lithium bisfluorosulfimide.

In an embodiment, said solvent includes a cyclic solvent and a linear solvent.

In an embodiment, said cyclic solvent is one or more of ethylene carbonate, propylene carbonate, γ-butyrolactone, phenyl acetate, 1,4-butylsultone and 3,3,3-trifluoropropene carbonate; and said linear solvent is one or more of dimethyl carbonate, methyl ethyl carbonate, diethyl carbonate, ethyl acetate, methyl propyl carbonate, propyl propionate, 1,1,2,2-tetrafluoroethyl-2,2,3,3-tetrafluoropropyl ether, 2,2-difluoroethyl acetate, 2,2-difluoroethyl propionate and methyl 2,2-difluoroethyl carbonate.

An additive in an electrolyte solution of the energy storage device is the bissulfonate compound as described in any one of above-mentioned embodiments.

In an embodiment, said energy storage device is a lithium ion battery or a super capacitor.

When the above-mentioned bissulfonate compound is applied to the energy storage device as an additive, the bissulfonate compound decomposes, so that a stable SEI film can be formed on a surface of an anode of the energy storage device, and the decomposition of a solvent in the electrolytic solution can be suppressed. As the stable SEI film can be formed on the surface of the anode, lithium ions can be smoothly intercalated and deintercalated at a low temperature, thereby improving the low-temperature performance of the energy storage device. Furthermore, a sulfonate group in the bissulfonate compound can coordinate with transition metal ions to form a complex, so that the surface of the cathode is passivated, the dissolution of the metal ions of the cathode is suppressed, and the decomposition effect of the solvent by an active substance in a high oxidation state is reduced, thereby improving the electrochemical performance of the energy storage device under a high temperature condition. In the energy storage device, the bissulfonate compound can inhibit the increase of the direct current internal resistance, and improve the high temperature performance and the low-temperature performance of the energy storage device.

The above-mentioned preparation method of bissulfonate compound is achieved by esterification of the dihydroxy compound and the sulfonyl halides, which is simple with mild reaction conditions.

Since the additive in the electrolyte solution of the energy storage device is the bissulfonate compound, and due to the action of the bissulfonate compound, a stable SEI film can be formed on the surface of the anode of the energy storage device, the surface of the cathode is passivated, and the bissulfonate compound can inhibit the increase of DC internal resistance, so that the above-mentioned energy storage device achieves good high-temperature performance and low-temperature performance.

DETAILED DESCRIPTION OF THE EMBODIMENTS

Figure 1:
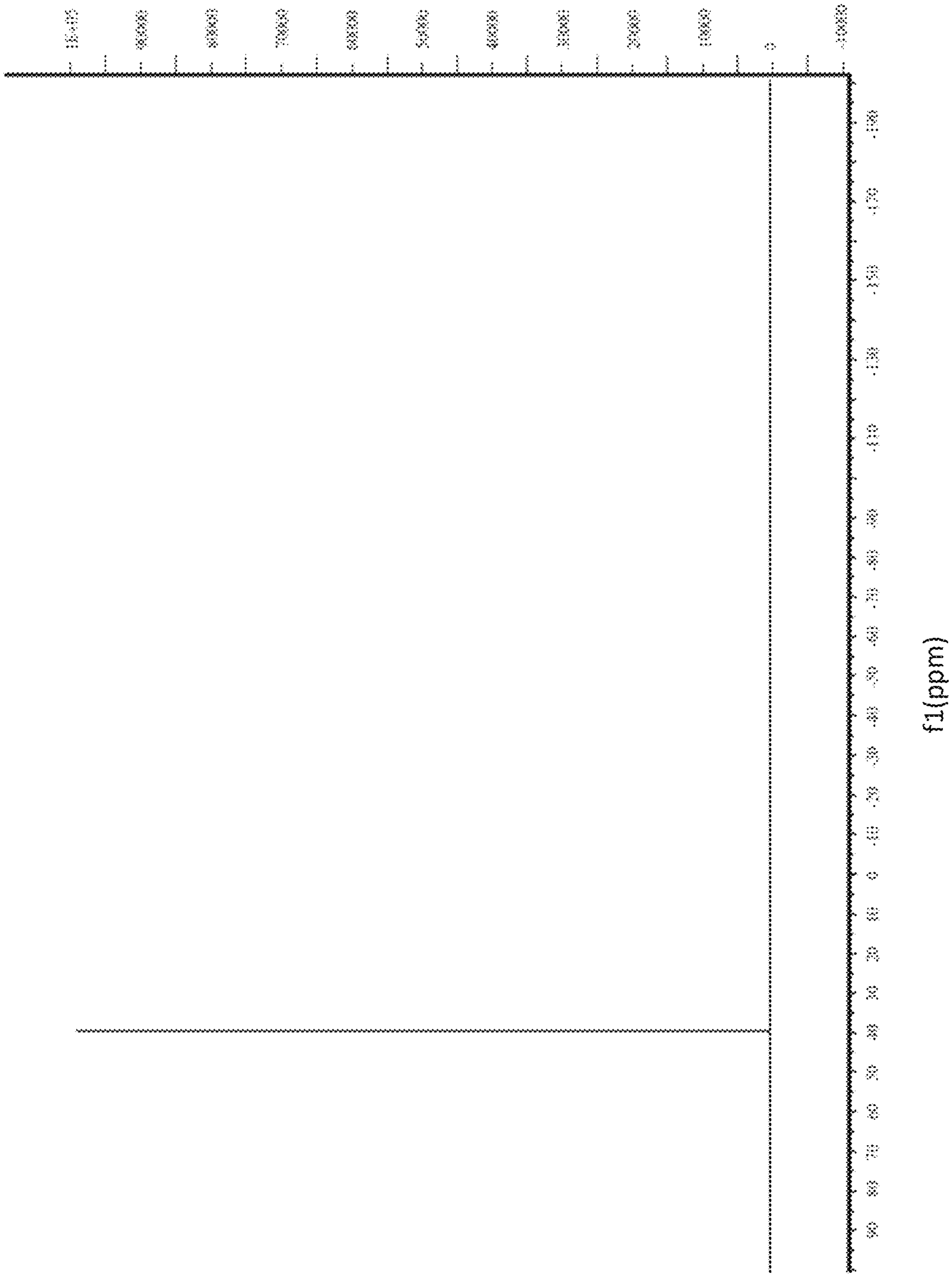
FIG. 1 is a fluorine nuclear magnetic resonance spectrum of a bissulfonate compound in Example 3.

In order to facilitate the understanding of the present disclosure, the present disclosure will be described more comprehensively below with reference to the relevant drawings. Preferred embodiments of the present disclosure are given in the accompanying drawings. However, the present disclosure can be implemented in many different forms and is not limited to the embodiments described herein. On the contrary, these embodiments are provided for the purpose of making the understanding of the disclosure of the present disclosure more thorough and comprehensive.

It should be noted that when an element is described as being "fixed to" another element, it can be directly provided on another element or an additional element may exist therebetween. When an element is considered to be "connected" to another element, it can be directly connected to another element or an additional element may exist therebetween.

Unless otherwise defined, all technical and scientific terms used herein have the same meanings as those generally understood by those skilled in the technical field to which the present disclosure belongs. The terms used in the specification of the present disclosure herein are only for the purpose of describing specific embodiments and are not intended to limit the present disclosure. The term "and/or" as used herein includes any one and all combinations of one or more related listed items.

An embodiment of the present disclosure provides a bissulfonate compound having a structure shown by General Formula M:

(I)

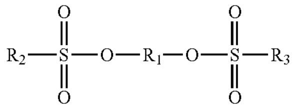

wherein $R_1$ is selected from chain alkyl containing 1 to 6 carbon atoms, ternary cycloalkyl, quaternary cycloalkyl, 5-membered cycloalkyl, 6-membered cycloalkyl, phenyl, tolyl, 5-membered heterocyclic group or 6-membered heterocyclic group; $R_2$ and $R_3$ are independently selected from the group consisting of hydrogen atom, halogen atom, alkyl containing 1 to 6 carbon atoms or haloalkyl containing 1 to 6 carbon atoms.

When the bissulfonate compound in this embodiment is applied to the energy storage device as an additive, the bissulfonate compound decomposes, so that a stable SEI film can be formed on a surface of an anode of the energy storage device, and the decomposition of a solvent in the electrolytic solution can be suppressed. As the stable SEI film can be formed on the surface of the anode, lithium ions can be smoothly intercalated and deintercalated at a low temperature, thereby improving the low-temperature performance of the energy storage device. Furthermore, a sulfonate group in the bissulfonate compound can coordinate with transition metal ions to form a complex, so that the surface of the cathode is passivated, the dissolution of the metal ions of the cathode is suppressed, and the decomposition effect of the solvent by an active substance in a high oxidation state is reduced, thereby improving the electrochemical performance of the energy storage device under a high temperature condition. In the energy storage device, the bissulfonate compound can inhibit the increase of the direct current internal resistance, and improve the high temperature performance and the low-temperature performance of the energy storage device.

In a specific example, $R_1$ is selected from the group consisting of ternary cycloalkyl, quaternary cycloalkyl, 5-membered cycloalkyl, 6-membered cycloalkyl, phenyl, 5-membered heterocyclic group or 6-membered heterocyclic group, and

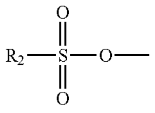 and 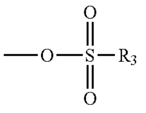

are in ortho-position, meta-position or para-position.

In a specific example, $R_1$ is selected from the group consisting of methylene, cyclopropyl, cyclobutyl, cyclopentyl, cyclohexyl, phenyl, furan, thiophene, pyrrole, thiazole, imidazole, pyridine, pyrazine, pyrimidine or pyridazine.

In a specific example, $R_2$ and $R_3$ are independently selected from the group consisting of hydrogen atom, fluorine atom, methyl, ethyl, propyl, butyl, pentyl, hexyl, isopropyl, isobutyl, sec-butyl, tert-butyl, isopentyl, isohexyl, fluoromethyl, fluoroethyl, fluoropropyl, fluorobutyl, fluoropentyl, fluorohexyl, fluoroisopropyl, fluoroisobutyl, fluorosec-butyl, fluorotert-butyl, fluoroisopentyl or fluoroisohexyl.

Preferably, $R_2$ and $R_3$ contain fluorine atoms. The bissulfonate compounds composed of $R_2$ and $R_3$ containing fluorine atoms can form a stable and flexible SEI in the energy storage device, which is more favorable for improving the high-temperature performance and low-temperature performance of the energy storage device.

In a specific example, $R_2$ and $R_3$ are independently selected from the group consisting of trifluoromethyl, trifluoroethyl, trifluopropyl, trifluorobutyl, trifluoropentyl, trifluorohexyl, trifluoroisopropyl, trifluoroisobutyl, trifluorosec-butyl, trifluorotert-butyl, trifluoroisopentyl or trifluoroisohexyl.

An embodiment of the present disclosure provides a method for preparing the above-mentioned bissulfonate compound, which includes the following step:

reacting a dihydroxy compound having General Formula (II), a first sulfonyl halide having General Formula (III) and a second sulfonyl halide having General Formula (IV) in a solvent added with alkali under a protective gas atmosphere, $$HO—R_1—OH \quad (II)$$

(III)

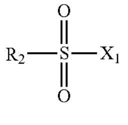

-continued (IV)

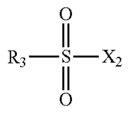

wherein, $X_1$ and $X_2$ are independently selected from halogen atoms; reaction temperature is −50° C. to 100° C.; and reaction time is 0.1 h to 24 h.

In a specific example, the protective gas atmosphere is nitrogen protective atmosphere. It can be understood that the protective gas atmosphere can also be an inert gas protective atmosphere.

Preferably, the reaction temperature is −20° C. to 60° C. If the reaction temperature is too low, the reaction activity of reactants will become low and the reaction time will be long; while if the reaction temperature is too high, the degree of side reaction will increase, and even the product decomposition will occur. When the reaction temperature is −20° C. to 60° C., the activity of the reactant is relatively high and the degree of side reaction is relatively low, which is favorable for improving the reaction rate and reaction yield.

Preferably, the reaction time is 0.5 h to 10 h. If the reaction time is too short, there will be reactant residues, the reaction will be insufficient and the reaction yield will be low; while if the reaction time is too long, the degree of side reaction will increase, and even the product decomposition will occur. In the actual production process, the appropriate reaction time can be selected according to the reaction scale and reaction temperature.

In a specific example, a ratio of a sum of amounts of substance of the first sulfonyl halide and the second sulfonyl halide to an amount of the substance of the dihydroxy compound is (0.5~5):1; and a ratio of the sum of the amounts of substance of the first sulfonyl halide and the second sulfonyl halide to an amount of substance of the alkali is 1:(0.5~3).

Preferably, the ratio of the sum of the amounts of substances of the first sulfonyl halide and the second sulfonyl halide to the amount of substance of the dihydroxy compound is (0.9~2.3):1; and the ratio of the sum of the amounts of substance of the first sulfonyl halide and the second sulfonyl halide to the amount of substance of the alkali is 1:(0.9~1.3).

In a specific example, the alkali is one or more of potassium hydroxide, potassium carbonate, sodium hydroxide, calcium hydroxide, pyridine, pyrrole, imidazole, trimethylamine and triethylamine; and/or the solvent is one or more of toluene, dichloroethane, acetonitrile, dimethyl sulfoxide and acetone.

An embodiment of the present disclosure provides an electrolyte solution comprising an electrolyte, a solvent and an additive, and the additive is the above-mentioned bissulfonate compound.

In a specific example, the electrolyte accounts for 5% to 20% of the weight of the electrolyte solution. In the case that the electrolyte accounts for 5% to 20% of the weight of the electrolyte solution, positive and negative ions have high transport rate, and the electrochemical performance of energy storage device can be improved. Preferably, the electrolyte accounts for 10% to 18% of the weight of the electrolyte solution.

In a specific example, the additive accounts for 0.01% to 10% of the weight of the electrolyte solution. If the additive content is too low, the improvement effect on the high and low temperature performance of the energy storage device will be poor; while too high additive content (the additive accounts for more than 10% of the weight of the electrolyte solution) will lead to the formation of a too thick SEI film, which will increase the impedance of the battery.

Preferably, the additive accounts for 0.01% to 0.08%, 0.1% to 5%, and 6% to 9% of the weight of the electrolyte solution. Further preferably, the bissulfonate compound accounts for 0.05%, 0.5%, 1%, 2%, 3%, and 8% of the weight of the electrolyte solution.

In a specific example, the electrolyte is one or more of lithium hexafluorophosphate, lithium tetrafluoroborate, lithium difluorophosphate and lithium bisfluorosulfimide.

In a specific example, the solvent includes a cyclic solvent and a linear solvent.

In a specific example, the cyclic solvent is one or more of ethylene carbonate, propylene carbonate, γ-butyrolactone, phenyl acetate, 1,4-butylsultone and 3,3,3-trifluoropropene carbonate; the linear solvent is one or more of dimethyl carbonate, methyl ethyl carbonate, diethyl carbonate, ethyl acetate, methyl propyl carbonate, propyl propionate, 1,1,2,2-tetrafluoroethyl-2,2,3,3-tetrafluoropropyl ether, 2,2-difluoroethylacetate, 2,2-difluoroethylpropionate and methyl 2,2-difluoroethyl carbonate.

An embodiment of the present disclosure provides an energy storage device, and an additive in an electrolyte solution of the energy storage device is the above-mentioned bissulfonate compound.

In an embodiment, the energy storage device is a lithium ion battery or a super capacitor.

In a specific example, a cathode material of the energy storage device includes one or more of $Li_{1+a}(Ni_xCo_yM_{1-x-y})O_2$, $Li(Ni_pMn_qCo_{2-p-q})O_4$, and $LiM_h(PO_4)_m$; wherein $0 \leq a \leq 0.3$, $0 \leq x \leq 1$, $0 \leq y \leq 1$, $0 < x+y \leq 1$; $0 \leq p \leq 2$, $0 < q \leq 2$, $0 < p+q \leq 2$; $0 < h < 5$, $0 < m < 5$; M is Fe, Ni, Co, Mn, Al or V.

In a specific example, an anode material of the energy storage device includes one or more of metal lithium, lithium alloy, carbon, silicon-based anode material and tin-based anode material.

The additive in the electrolyte solution of the energy storage device in this embodiment is the above-mentioned bissulfonate compound. Due to the action of the bissulfonate compound, a stable SEI film can be formed on the surface of the anode of the energy storage device, the surface of the cathode is passivated, and the bissulfonate compound can inhibit the increase of DC internal resistance, so that the above-mentioned energy storage device achieves good high-temperature performance and low-temperature performance. This energy storage device has good high-temperature performance and low-temperature performance, and has good capacity retention when stored or used under high-temperature and low-temperature conditions.

The following are specific examples.

1. Assembly of lithium ion battery

EXAMPLE 1

(1) The structural Formula of the bissulfonate compound in this example was shown by Formula (V).

Formula (V)

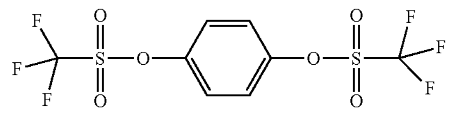

The preparation method of the bissulfonate compound of Formula (V) was as follows: hydroquinone, toluene and triethylamine were added into a reactor at room temperature under nitrogen protective atmosphere, and a first sulfonyl halide ($R_2$ was trifluoromethyl, and $X_1$ was fluorine atom) and a second sulfonyl halide ($R_3$ was trifluoromethyl, and $X_2$ was fluorine atom) were then added into the reactor at 0° C. to 10° C. Reaction temperature was adjusted to 40° C. to 45° C.; and reaction time was 8 h to 10 h.

The amount of substance of the first sulfonyl halide was equal to that of the second sulfonyl halide, and the ratio of the sum of the amounts of substance of the two to the amount of substance of hydroquinone was 2:1. The ratio of the sum of the amounts of substance of the first sulfonyl halide and the second sulfonyl halide to the amount of substance of triethylamine was 1:1.

(2) Assembly of lithium ion battery:

In this example, the bissulfonate compound accounted for 1% of the weight of the electrolyte solution; the electrolyte was lithium hexafluorophosphate, which accounted for 13% of the weight of the electrolyte solution; the solvent was a mixture of ethylene carbonate and dimethyl carbonate in a weight ratio of 1:2; the cathode material was $LiNi_{0.8}Co_{0.1}Mn_{0.1}O_2$; the anode material was artificial graphite; and the separator was polyethylene film. All components were assembled to form a soft-packing battery according to a conventional method.

EXAMPLE 2

(1) The structural Formula of the bissulfonate compound in this example was shown by Formula (V).

(2) Assembly of lithium ion battery:

In this example, the bissulfonate compound accounted for 0.5% of the weight of the electrolyte solution; the electrolyte was lithium hexafluorophosphate, which accounted for 13% of the weight of the electrolyte solution; the solvent was a mixture of ethylene carbonate and dimethyl carbonate in a weight ratio of 1:2; the cathode material was $LiNi_{0.8}Co_{0.1}Mn_{0.1}O_2$; the anode material was artificial graphite; the separator was polyethylene film. All components were assembled to form a soft-packing battery according to a conventional method.

EXAMPLE 3

(1) The structural Formula of the bissulfonate compound in this example was shown by Formula (VI)

Formula (VI)

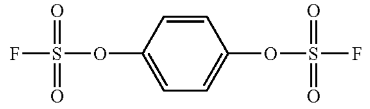

The preparation method of the bissulfonate compound in Formula (VI) was as follows: hydroquinone, toluene and triethylamine were added into a reactor at room temperature under nitrogen protective atmosphere, and a first sulfonyl halide ($R_2$ was fluorine atom, and $X_1$ was fluorine atom) and a second sulfonyl halide ($R_3$ was fluorine atom, and $X_2$ was fluorine atom) were then added into the reactor at 0° C. to 10° C. Reaction temperature was adjusted to 43° C. to 50° C.; and reaction time was 1 h to 4 h.

The amount of substance of the first sulfonyl halide was equal to that of the second sulfonyl halide, and the ratio of the sum of the amounts of substance of the two to the amount of substance of hydroquinone was 2:1. The ratio of the sum of the amounts of substance of the first sulfonyl halide and the second sulfonyl halide to the amount of substance of triethylamine was 1:1.

The fluorine nuclear magnetic resonance spectrum of the bissulfonate compound of Formula (VI) was shown in FIG. 1, 19F-NMR (400 MHz, deuterated DMSO), δ39.2 ppm (s, 2F).

Figure 2:
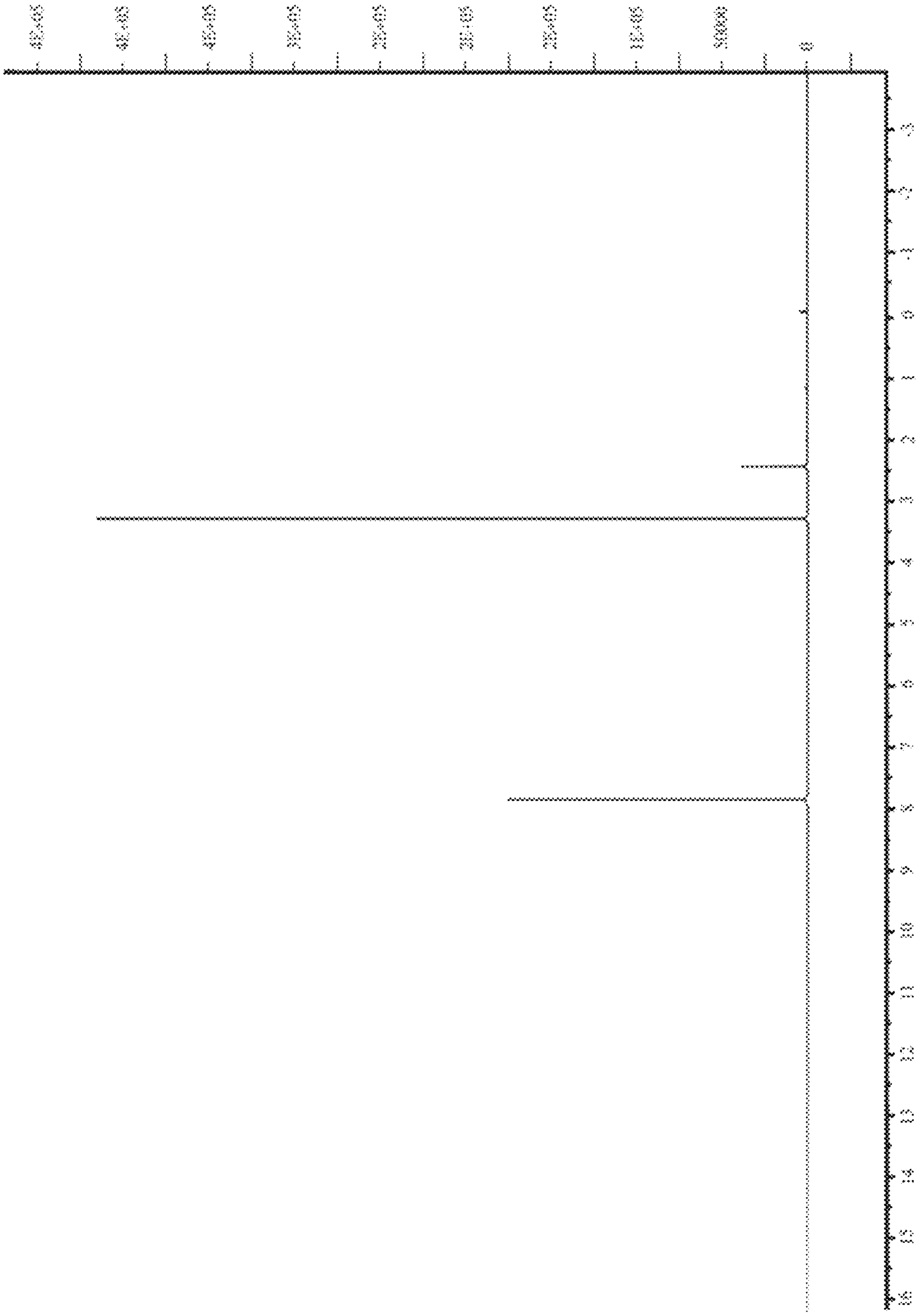
FIG. 2 is a hydrogen nuclear magnetic resonance spectrum of a bissulfonate compound in Example 3.

The hydrogen nuclear magnetic resonance spectrum of the bissulfonate compound of Formula (VI) was shown in FIG. 2, $^{1}$H-NMR (400 MHz, deuterated DMSO), δ7.9 ppm (s, 4H).

(2) Assembly of lithium ion battery:

In this example, the bissulfonate compound accounted for 1% of the weight of the electrolyte solution; the electrolyte was lithium hexafluorophosphate, which accounted for 13% of the weight of the electrolyte solution; the solvent was a mixture of ethylene carbonate and dimethyl carbonate in a weight ratio of 1:2; the cathode material was $LiNi_{0.8}Co_{0.1}Mn_{0.1}O_2$; the anode material was artificial graphite; and the separator was polyethylene film. All components were assembled to form a soft-packing battery according to a conventional method.

EXAMPLE 4

(1) The structural Formula of the bissulfonate compound in this example was shown by Formula (VI).

(2) Assembly of lithium ion battery:

In this example, the bissulfonate compound accounted for 10% of the weight of the electrolyte solution; the electrolyte was lithium hexafluorophosphate, which accounted for 13% of the weight of the electrolyte solution; the solvent was a mixture of ethylene carbonate and dimethyl carbonate in a weight ratio of 1:2; the cathode material was $LiNi_{0.8}Co_{0.1}Mn_{0.1}O_2$; the anode material was artificial graphite; and the separator was polyethylene film. All components were assembled to form a soft-packing battery according to a conventional method.

EXAMPLE 5

(1) The structural Formula of the bissulfonate compound in this example was shown by Formula (VI).

(2) Assembly of lithium ion battery:

In this example, the bissulfonate compound accounted for 1% of the weight of the electrolyte solution; the electrolyte was lithium hexafluorophosphate, which accounted for 13% of the weight of the electrolyte solution; the solvent was a mixture of ethylene carbonate and dimethyl carbonate in a weight ratio of 1:2; the cathode material was $LiNi_{0.8}Co_{0.1}Mn_{0.1}O_2$; the anode material was silicon carbon composite material; and the separator was polyethylene film. All components were assembled to form a soft-packing battery according to a conventional method.

EXAMPLE 6

(1) The structural Formula of the bissulfonate compound in this example was shown by Formula (VI).

(2) Assembly of lithium ion battery:

In this example, the bissulfonate compound accounted for 1% of the weight of the electrolyte solution; the electrolyte was lithium hexafluorophosphate, which accounted for 13% of the weight of the electrolyte solution; the solvent was a mixture of ethylene carbonate and dimethyl carbonate in a weight ratio of 1:2; the cathode material was $LiNi_{0.6}Co_{0.2}Mn_{0.2}O_2$; the anode material was artificial graphite; and the separator was polyethylene film. All components were assembled to form a soft-packing battery according to a conventional method.

EXAMPLE 7

(1) The structural Formula of the bissulfonate compound in this example was shown by Formula (VI).

(2) Assembly of lithium ion battery:

In this example, the bissulfonate compound accounted for 1% of the weight of the electrolyte solution; the electrolyte was lithium hexafluorophosphate, which accounted for 18% of the weight of the electrolyte solution; the solvent was a mixture of ethylene carbonate and dimethyl carbonate in a weight ratio of 1:2; the cathode material was $LiNi_{0.6}Co_{0.2}Mn_{0.2}O_2$; the anode material was artificial graphite; and the separator was polyethylene film. All components were assembled to form a soft-packing battery according to a conventional method.

EXAMPLE 8

(1) The structural Formula of the bissulfonate compound in this example was shown by Formula (V).

(2) Assembly of lithium ion battery:

In this example, the bissulfonate compound accounted for 1% of the weight of the electrolyte solution; the electrolyte was lithium hexafluorophosphate, which accounted for 13% of the weight of the electrolyte solution; the solvent was a mixture of ethylene carbonate and 2,2-difluoroethyl propionate in a weight ratio of 1:2; the cathode material was $LiNi_{0.8}Co_{0.1}Mn_{0.1}O_2$; the anode material was artificial graphite; and the separator was polyethylene film. All components were assembled to form a soft-packing battery according to a conventional method.

EXAMPLE 9

(1) The structural Formula of the bissulfonate compound in this example was shown by Formula (V).

(2) Assembly of lithium ion battery:

In this example, the bissulfonate compound accounted for 1% of the weight of the electrolyte solution; the electrolyte was lithium hexafluorophosphate and lithium bisfluorosulfimide, which accounted for 10% and 3% of the weight of the electrolyte solution, respectively; the solvent was a mixture of ethylene carbonate and 2,2-difluoroethyl propionate in a weight ratio of 1:2; the cathode material was $LiNi_{0.8}Co_{0.1}Mn_{0.1}O_2$; the anode material was artificial graphite; and the separator was polyethylene film. All components were assembled to form a soft-packing battery according to a conventional method.

EXAMPLE 10

(1) The structural Formula of the bissulfonate compound in this example was shown by Formula (V).

(2) Assembly of lithium ion battery:

In this example, the bissulfonate compound accounted for 1% of the weight of the electrolyte solution; the electrolyte was lithium hexafluorophosphate, which accounted for 13% of the weight of the electrolyte solution; the solvent was a mixture of 3,3,3-trifluoropropene carbonate and 2,2-difluoroethyl acetate in a weight ratio of 1:2; the cathode material was $LiNi_{0.8}Co_{0.1}Mn_{0.1}O_2$; the anode material was artificial graphite; and the separator was polyethylene film. All components were assembled to form a soft-packing battery according to a conventional method.

COMPARATIVE EXAMPLE 1

Compared with Example 1, the difference of Comparative Example 1 was that the bissulfonate compound was not contained in the electrolyte solution.

COMPARATIVE EXAMPLE 2

Compared with Example 1, the difference of Comparative Example 2 was that the additive was an ethylene sulfate additive which accounted for 1% of the weight of the electrolyte solution.

COMPARATIVE EXAMPLE 3

Compared with Example 1, the difference of Comparative Example 3 was that the additive was a 1,3-propane sultone additive which accounted for 1% of the weight of the electrolyte solution.

2. Test of High and Low Temperature Performances of Lithium Ion Batteries

Lithium ion batteries in Examples 1 to 10 and Comparative Examples 1 to 3 were tested on their high and low temperature performances. The test method was as follows:

High temperature cycle performance: the lithium-ion battery was put in a 45° C. thermostat, charged to 4.2 V at 1 C current under constant current constant voltage, and then discharged to 3.0 V at 1 C current under constant current; and the capacity retention of the lithium ion battery was measured after 400 cycles.

High temperature storage performance: the formed lithium ion battery was charged to 4.2 V at 1 C current under constant current constant voltage at room temperature, and the initial capacity of the battery was measured; subsequently, after being stored at 60° C. for 30 days, the battery was discharged to 3 V at 1 C and then charged to 4.2 V, and the capacity retention of the lithium ion battery was measured.

Low temperature discharge performance: the formed lithium ion battery was charged to 4.2 V at 1 C under constant current constant voltage at room temperature, and the initial capacity of the battery was measured; subsequently, the battery was placed in a thermostat with a constant temperature of −20° C. and discharged to 2.5 V at 0.5 C, and the capacity retention of the lithium ion battery was measured.

The test results were shown in Table 1.

TABLE 1

| No. | Capacity retention after 400 cycles at high temperature | Capacity retention after storage for 30 days at high temperature | Capacity retention after discharge at low temperature |
|---|---|---|---|
| Example 1 | 94.5% | 93.8% | 61.3% |
| Example 2 | 93.1% | 92.2% | 60.0% |
| Example 3 | 94.6% | 94.4% | 63.2% |
| Example 4 | 93.3% | 93.5% | 58.3% |
| Example 5 | 82.2% | 87.5% | 65.3% |
| Example 6 | 94.4% | 93.1% | 62.2% |
| Example 7 | 89.6% | 93.4% | 59.7% |
| Example 8 | 90.8% | 95.1% | 64.7% |
| Example 9 | 94.2% | 95.9% | 65.1% |
| Example 10 | 87.2% | 98.1% | 69.2% |

TABLE 1-continued

| No. | Capacity retention after 400 cycles at high temperature | Capacity retention after storage for 30 days at high temperature | Capacity retention after discharge at low temperature |
|---|---|---|---|
| Comparative Example 1 | 75.3% | 79.1% | 53.6% |
| Comparative Example 2 | 85.6% | 88.7% | 54.6% |
| Comparative Example 3 | 88.9% | 90.1% | 55.1% |

It can be seen from Table 1 that the lithium ion batteries in Examples 1 to 10 had better high temperature cycle performance, high temperature storage performance and low temperature discharge performance than those in Comparative Examples 1 to 3, indicating that the additives in the electrolyte solution in Examples 1 to 10 can effectively improve the high temperature performance and low temperature performance of the lithium ion batteries.

The technical features of the above-mentioned embodiments can be combined arbitrarily. In order to make the description concise, not all possible combinations of the technical features in the above-mentioned embodiments are described herein. However, the combinations of these technical features shall be considered to be within the scope of the specification as long as they do not conflict with each other.

The above-mentioned examples only describe several embodiments of the present disclosure, which are described in detail, but it cannot be understood as limiting the scope of the present disclosure. It should be noted that for those of ordinary skill in the art, several modifications and improvements can be made without departing from the concept of the present disclosure, which belong to the protection scope of the present disclosure. Therefore, the protection scope of the present disclosure shall be subject to the appended claims.

What is claimed is:

1. An energy storage device, wherein an additive in an electrolyte solution of the energy storage device is a bissulfonate compound having a structure shown by General Formula (I):

(I)

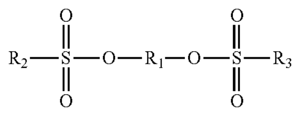

wherein $R_1$ is phenyl or tolyl; and each of $R_2$ and $R_3$ is independently a halogen atom, and wherein the energy storage device is a lithium ion battery or a super capacitor.

2. The energy storage device of claim 1, wherein

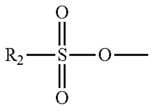

and

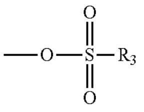

are in ortho-position, meta-position or para-position.

3. The energy storage device of claim 1, wherein $R_2$ and $R_3$ are independently selected from the group consisting of each a fluorine atom or fluoromethyl.

4. The energy storage device of claim 1, wherein the electrolyte solution further comprises an electrolyte and a solvent.

5. The energy storage device of claim 4, wherein the electrolyte accounts for 5% to 20% of the weight of the electrolyte solution.

6. The energy storage device of claim 4, wherein the additive accounts for 0.01% to 10% of the weight of the electrolyte solution.

7. The energy storage device of claim 4, wherein the electrolyte is one or more of lithium hexafluorophosphate, lithium tetrafluoroborate, lithium difluorophosphate, and lithium bisfluorosulfimide.

8. The energy storage device of claim 4, wherein the solvent comprises a cyclic solvent and a linear solvent.

9. The energy storage device of claim 8, wherein the cyclic solvent is one or more of ethylene carbonate, propylene carbonate, γ-butyrolactone, phenyl acetate, 1,4-butylsultone and 3,3,3-trifluoropropene carbonate; and the linear solvent is one or more of dimethyl carbonate, methyl ethyl carbonate, diethyl carbonate, ethyl acetate, methyl propyl carbonate, propyl propionate, 1,1,2,2-tetrafluoroethyl-2,2,3,3-tetrafluoropropyl ether, 2,2-difluoroethyl acetate, 2,2-difluoroethyl propionate and methyl 2,2-difluoroethyl carbonate.

10. The energy storage device of claim 1, wherein the electrolyte solution includes a solvent comprising a cyclic solvent and a linear solvent.

11. The energy storage device of claim 1, wherein the energy storage device is the lithium ion battery.

12. The energy storage device of claim 1, wherein the energy storage device is the super capacitor.

13. The energy storage device of claim 1, wherein the bissulfonate compound has the formula

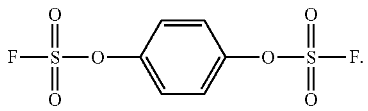 [SMILES: O=S(=O)(F)Oc1ccc(OS(=O)(=O)F)cc1]

14. An energy storage device, comprising a cathode, an anode, and a film on the anode, wherein the film on the anode includes a decomposed bissulfonate compound, said bissulfonate compound having a structure shown by General Formula (I):

(I)

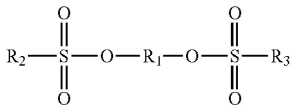

wherein R1 is phenyl or tolyl; and each of R2 and R3 is independently a halogen atom, and where the energy storage device is a lithium ion battery or a super capacitor.

15. The energy storage device of claim 14, wherein each of $R_2$ and $R_3$ is F.

16. The energy storage device of claim 14, wherein R1 is phenyl.

* * * * *